US010691252B2

(12) United States Patent
Xu et al.

(10) Patent No.: US 10,691,252 B2
(45) Date of Patent: Jun. 23, 2020

(54) TOUCH DETECTION CHIP, TOUCH PANEL AND TOUCH DETECTING METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shuai Xu, Beijing (CN); Zhengxin Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/142,532

(22) Filed: Sep. 26, 2018

(65) Prior Publication Data

US 2019/0095034 A1    Mar. 28, 2019

(30) Foreign Application Priority Data

Sep. 28, 2017    (CN) .......................... 2017 1 0897023

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0443* (2019.05); *G06F 3/0446* (2019.05); *G06F 2203/04104* (2013.01)

(58) Field of Classification Search
CPC .. G06F 3/0488; G06F 3/0416; G06F 3/04886; G06F 3/04883; G06F 2203/04104; G06F 3/044
See application file for complete search history.

(56) References Cited

U.S. PATENT DOCUMENTS

2019/0034054 A1*    1/2019    Zhang ................... G06F 1/3228

FOREIGN PATENT DOCUMENTS

| CN | 104063097 A | 9/2014 |
| CN | 105094487 A | 11/2015 |
| CN | 105677121 A | 6/2016 |
| CN | 105824465 A | 8/2016 |
| CN | 106648247 A | 12/2016 |

OTHER PUBLICATIONS

First Chinese Office Action dated Nov. 15, 2019.

* cited by examiner

*Primary Examiner* — Gerald Johnson
(74) *Attorney, Agent, or Firm* — Dilworth & Barrese, LLP.; Michael J. Musella, Esq.

(57) ABSTRACT

A touch detection chip, a touch panel and a touch detecting method are disclosed. The touch detecting method includes: detecting a signal amount of each of a plurality of touch units; determining candidate touch units according to the signal amount of each of the plurality of touch units; and determining a target touch unit from the candidate touch units according to signal amounts of adjacent touch units of each of the candidate touch units.

18 Claims, 5 Drawing Sheets

| 0 | 0 | 0 | 0 | 0 | 2 | 0 | 0 | 0 |
|---|---|---|---|---|---|---|---|---|
| 0 | 0 | 0 | 0 | 0 | 0 | 2 | 0 | 0 |
| 0 | 2 | 0 | 0 | 0 | 0 | 0 | 0 | 0 |
| 2 | 0 | 0 | 0 | 4 | 0 | 0 | 0 | 0 |
| 0 | 0 | -2 | 0 |  | 0 | 0 | 0 | 0 |
| 0 | 2 | 0 | 0 | 0 | 0 | 0 | 0 | 0 |
| 0 | 0 | 0 | 0 | 0 | 0 | 0 | -2 | 0 |
| 0 | 0 | 0 | 0 | 0 | 2 | 0 | 0 | 0 |
| 0 | -2 | 0 | 2 | 0 | 0 | 0 | 0 | 0 |
| 0 | 0 | 0 | 4 | 2 | 2 | 0 | 0 | 0 |
| 0 | 0 | 0 | 4 | 11 | 9 | 2 | 0 | 0 |
| 0 | 2 | 6 | 43 | 97 | 61 | 20 | 6 | 2 |
| 2 | 4 | 22 | 218 | 343 | 259 | 66 | 15 | 6 |
| 4 | 0 | 47 | 220 |  | 346 | 134 | 22 | 6 |
| 0 | 2 | 20 | 214 | 355 | 257 | 72 | 15 | 9 |
| 0 | 0 | 9 | 36 | 93 | 52 | 11 | 4 | 0 |
| 0 | 0 | 0 | 0 | 4 | 2 | 0 | 0 | 0 |
| 0 | 0 | 0 | 2 | 0 | 0 | 0 | 0 | 0 |

FIG. 3

| 0 | 0 | 0 | 4 | 2 | 2 | 0 | 0 | 0 |
|---|---|---|---|---|---|---|---|---|
| 0 | 0 | 0 | 11 | 27 | 15 | 6 | 0 | 0 |
| 0 | 2 | 6 | 77 | 193 | 111 | 22 | 0 | 2 |
| 2 | 0 | 13 | 195 | 321 | 245 | 47 | 0 | 0 |
| 0 | 0 | 15 | 184 |  | 186 | 59 | 0 | 0 |
| 0 | 2 | 4 | 52 | 184 | 116 | 20 | 2 | 0 |
| 0 | 0 | 0 | 4 | 15 | 13 | 6 | 0 | 0 |
| 0 | 0 | 0 | 0 | 2 | 2 | 0 | 0 | 0 |
| 0 | 0 | 0 | 2 | 0 | 0 | 0 | 0 | 0 |
| 0 | 0 | 0 | 0 | 0 | 2 | 0 | 0 | 0 |
| 0 | 0 | 0 | 0 | 0 | 0 | 2 | 0 | 0 |
| 0 | 2 | 0 | 0 | 0 | 0 | 0 | 0 | 0 |
| 2 | 0 | 0 | 0 | 4 | 0 | 0 | 0 | 0 |
| 0 | 0 | -2 | 0 |  | 0 | 0 | 0 | 0 |
| 0 | 2 | 0 | 2 | 0 | -2 | 0 | 0 | 0 |
| 0 | 0 | 0 | 0 | 0 | 0 | 0 | -2 | 0 |
| 0 | 0 | 0 | 0 | 0 | 2 | 0 | 0 | 0 |
| 0 | -2 | 0 | 2 | 0 | 0 | 0 | 0 | 0 |

FIG. 4

TOUCH DETECTION CHIP, TOUCH PANEL AND TOUCH DETECTING METHOD

CROSS-REFERENCE TO RELATED APPLICATION

The present application claims the priority of Chinese patent application No. 201710897023.0 filed on Sep. 28, 2017, and the entire content disclosed by the Chinese patent application is incorporated herein by reference as part of the present application.

TECHNICAL FIELD

Embodiments of the present disclosure relate to a touch detection chip, a touch panel and a touch detecting method.

BACKGROUND

A touch panel of a touch display device can adopt a single-layer self-capacitance structure. The single-layer self-capacitance touch panel has only one layer of ITO (Indium Tin Oxides), and each ITO touch unit is connected with a touch detection chip through a touch electrode line, so each ITO touch unit can be detected independently, and the function of single-touch or multi-touch can be implemented.

SUMMARY

At least one embodiment of the present disclosure provides a touch detecting method, comprising: detecting a signal amount of each of a plurality of touch units; determining candidate touch units according to the signal amount of each of the plurality of touch units; and determining a target touch unit from the candidate touch units according to signal amounts of adjacent touch units of each of the candidate touch units.

For example, in a touch detecting method provided by an embodiment of the present disclosure, detecting a signal amount of each of the plurality of touch units comprises: sending a pulse detection signal to each of the plurality of touch units, and detecting a change amount of capacitance value of each of the plurality of touch units, wherein the signal amount of each of the plurality of touch units comprises the change amount of capacitance value of each of the plurality of touch units.

For example, in a touch detecting method provided by an embodiment of the present disclosure, determining the candidate touch units according to the signal amount of each of the plurality of touch units comprises: judging whether the signal amount of each of the plurality of touch units is greater than a first preset threshold, and determining a touch unit having a signal amount greater than the first preset threshold as the candidate touch unit.

For example, in a touch detecting method provided by an embodiment of the present disclosure, determining the candidate touch units according to the signal amounts of each of the plurality of touch units comprises: dividing the plurality of touch units into a plurality of touch detection groups; summing signal amounts of touch units in each of the plurality of touch detection groups to obtain a signal amount sum of each of the plurality of touch detection groups; determining a candidate touch detection group from the plurality of touch detection groups, wherein the candidate touch detection group is a touch detection group having a signal amount sum greater than a first preset threshold; and judging whether a signal amount of each touch unit in the candidate touch detection group is greater than the first preset threshold, and determining a touch unit having the signal amount greater than the first preset threshold as the candidate touch unit.

For example, in a touch detecting method provided by an embodiment of the present disclosure, dividing the plurality of touch units into the plurality of touch detection groups comprises: dividing the plurality of touch units into the plurality of touch detection groups according to rows or columns.

For example, in a touch detecting method provided by an embodiment of the present disclosure, determining the target touch unit from the candidate touch units according to signal amounts of adjacent touch units of each of the candidate touch units comprises: judging whether at least one of the signal amounts of adjacent touch units of one of the candidate touch units is greater than a second preset threshold; and if the at least one of the signal amounts of adjacent touch units of the one of the candidate touch units is greater than the second preset threshold, determining the one of the candidate touch unit is the target touch unit.

For example, a touch detecting method provided by an embodiment of the present disclosure further comprising: determining a position of a single-touch or a multi-touch according to the target touch unit.

At least one embodiment of the present disclosure further provides a touch detection chip, comprising a processor and a non-volatile storage medium, wherein the storage medium stores computer executable codes, and the computer executable codes are capable of being executed by the processor to implement following operations: detecting a signal amount of each of a plurality of touch units; determining candidate touch units according to the signal amount of each of the plurality of touch units; and determining a target touch unit from the candidate touch units according to signal amounts of adjacent touch units of each of the candidate touch units.

For example, in a touch detection chip provided by an embodiment of the present disclosure, detecting signal amounts of each of the plurality of touch units comprises: sending a pulse detection signal to each of the plurality of touch units, and detecting a change amount of capacitance value of each of the plurality of touch units, wherein the signal amount of each of the plurality of touch units comprises the change amount of capacitance value of each of the plurality of touch units.

For example, in a touch detection chip provided by an embodiment of the present disclosure, determining the candidate touch units according to the signal amount of each of the plurality of touch units comprises: judging whether the signal amount of each of the plurality of touch units is greater than a first preset threshold, and determining a touch unit having a signal amount greater than the first preset threshold as the candidate touch unit.

For example, in a touch detection chip provided by an embodiment of the present disclosure, determining the candidate touch units according to the signal amounts of each of the plurality of touch units comprises: dividing the plurality of touch units into a plurality of touch detection groups; summing signal amounts of touch units in each of the plurality of touch detection groups to obtain a signal amount sum of each of the plurality of touch detection groups; determining a candidate touch detection group from the plurality of touch detection groups, wherein the candidate touch detection group is a touch detection group having a signal amount sum greater than a first preset threshold; and judging whether a signal amount of each touch unit in the candidate touch detection group is greater than the first preset threshold, and determining a touch unit having the signal amount greater than the first preset threshold as the candidate touch unit.

For example, in a touch detection chip provided by an embodiment of the present disclosure, dividing the plurality of touch units into the plurality of touch detection groups comprises: dividing the plurality of touch units into the plurality of touch detection groups according to rows or columns.

For example, in a touch detection chip provided by an embodiment of the present disclosure, determining the target touch unit from the candidate touch units according to signal amounts of adjacent touch units of each of the candidate touch units comprises: judging whether at least one of the signal amounts of adjacent touch units of one of the candidate touch units is greater than a second preset threshold; and if the at least one of the signal amounts of adjacent touch units of the one of the candidate touch units is greater than the second preset threshold, determining the one of the candidate touch unit is the target touch unit.

For example, in a touch detection chip provided by an embodiment of the present disclosure, the computer executable codes are capable of being executed by the processor to further implement following operation: determining a position of a single-touch or a multi-touch according to the target touch unit.

For example, in a touch detection chip provided by an embodiment of the present disclosure, the touch detection chip comprises a touch-and-display driver integration chip.

At least one embodiment of the present disclosure further provides a touch panel, comprising: the touch detection chip according to claim 10, a plurality of touch units and a plurality of touch electrode lines; and the plurality of touch electrode lines are electrically connected with the plurality of touch units, respectively.

BRIEF DESCRIPTION OF DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 3 is a schematic diagram of a signal amount distribution when a touch operation occurs at the touch unit C2 as shown in FIG. 1;

FIG. 4 is a schematic diagram of a signal amount distribution when a touch operation occurs at the touch unit A2 as shown in FIG. 1;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, common capacitive touch screens includes two types: self-capacitance touch screens and mutual-capacitance touch screens. Self-capacitance touch screens may be further classified into two-layer ITO (Indium Tin Oxides) touch screens and single-layer ITO touch screens. For example, for a touch panel as shown in FIG. 1, the touch panel adopts a single-layer ITO structure.

Figures 1, 2:
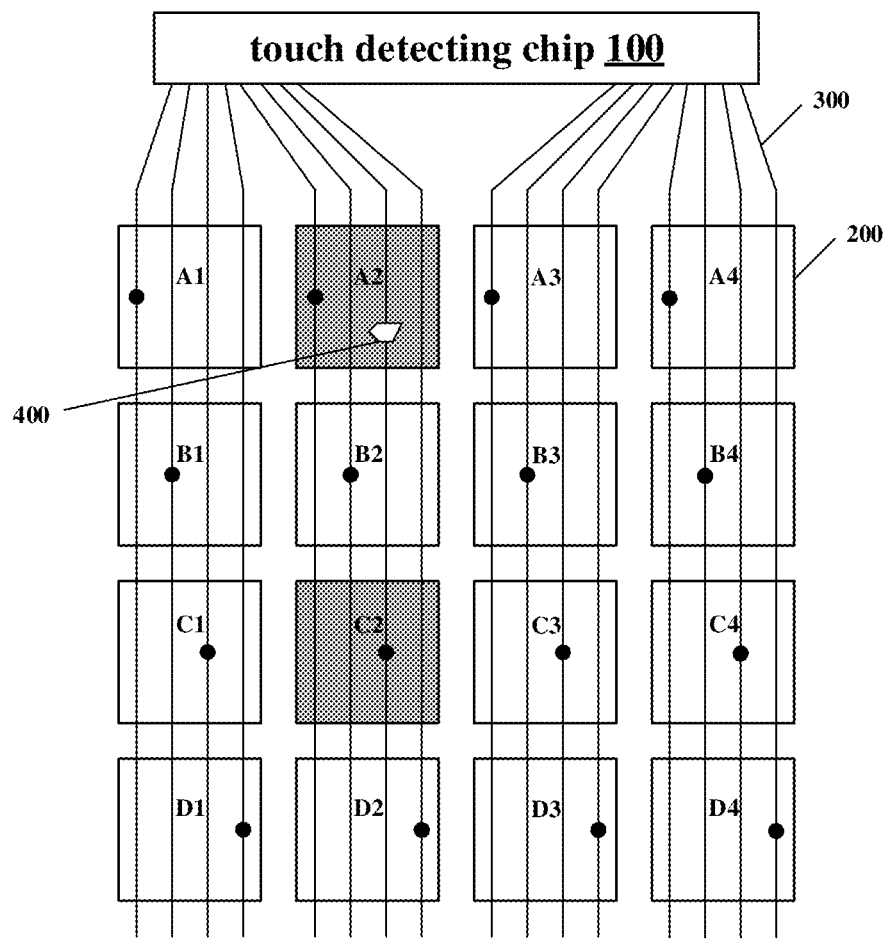
FIG. 1 is an exemplary schematic diagram of a "ghost touch" phenomenon caused by a short circuit in a display panel.
FIG. 2 is an exemplary schematic diagram showing that a signal amount of a touch unit is an effective signal amount.

As shown in FIG. 1, a plurality of touch units 200 are arranged in an array, and each of the plurality of touch units 200 is connected with a touch detection chip 100 through a single touch electrode line 300. Each of the plurality of touch units 200 and the ground generate self-capacitance. When an object such as a human body or a stylus touches the touch screen which is includes the plurality of touch units 200, the capacitance of the human body or the stylus is superimposed on the self-capacitance of the touch unit 200, and causing the capacitance value of the unit 200 to be changed. The touch detection chip 100 can detect a change amount of capacitance value of each of the plurality of touch units 200 through the touch electrode line 300, thereby determining the position coordinate at which the touch occurs.

It should be noted that, for a purpose of clear description, FIG. 1 only schematically shows a total of 16 touch units 200 that are arranged in four rows and four columns, but the touch panel can further include a larger number of touch units 200. For example, more rows of touch unit 200 can be provided between the row where the touch unit A2 is located and the row where the touch unit C2 is located, which is not limited in the disclosure. In addition, the sizes of the touch detection chip 100 and the touch unit 200 are merely illustrative and do not represent true size and scale.

For example, when a touch operation is performed at the position where the touch unit C2 is located as a center position, the touch detection chip 100 can detect the touch operation and process it to obtain a schematic diagram of the signal amount distribution as shown in FIG. 2. The number in each rectangular block as shown in FIG. 2 represents a signal amount (signal strength) of each touch unit. For example, the number "368" at the center position represents the signal amount of the touch unit C2 corresponding to the center position where the touch operation occurs. It should be noted that, FIG. 2 only shows the signal amount distribution of the partial region centered on the position where the touch unit C2 is located, and does not show the signal amount distribution of all touch units. The amount numbers such as 368, 97, 2, and 0 indicate the relative values but not absolute values.

For example, the signal amount of a touch unit can be a change amount of capacitance value of the touch unit between two time points that are before and after a touch operation respectively. The disclosure is not limited in this aspect, for example, the signal amount can also be a change amount of another kind of parameter (for example, current, voltage, etc.). As shown in FIG. 2, in the distribution signal amounts decrease in the radially outward direction with the amount "368" as a center, and the signal amount satisfying this distribution can be defined as an effective signal amount.

Most touch panels can also have a display function while implementing a touch function. Touch display products are all moving toward the trend of thinner profile and lighter weight, which puts higher requirements on the manufacturing process of the touch panel. As the difficulty of wiring in the touch panel increases, some process defects may occur. For example, a foreign object can be introduced into the touch panel during the manufacturing process, and the foreign object can be electrically conductive, thereby causing a short circuit.

For example, as shown in FIG. 1, if a foreign object 400 is present in the touch unit A2, the foreign object 400 short-circuits a touch electrode line passing through the touch unit A2 and the touch unit A2. The touch electrode line is used for detecting the signal amount of the touch unit C2, so the touch unit C2 connected with the touch electrode line and the touch unit A2 are short-circuited.

In the case that the foreign object 400 is present in the touch panel to cause a short circuit, for example, when a touch operation occurs near the position where the touch unit C2 is located, the touch unit A2 can also be detected having a certain signal amount. In this case, the signal amount distribution detected by the touch detection chip 100 is shown in FIG. 3. The distribution which has signal amounts decreasing in the radially outward direction with the amount "368" as a center as shown in FIG. 3 indicates that the signal amount of the touch unit C2 is an effective signal amount, and the signal amount of "77" as shown in FIG. 3 indicates that the signal amount of the touch unit A2 is an ineffective signal amount. It should be noted that, in the embodiments of the present disclosure, the effective signal amount refers to a signal amount caused by a real touch operation, and the ineffective signal amount refers to an abnormal signal amount caused by a short circuit defect or the like.

Similarly, for example, when a touch operation occurs near the position where the touch unit A2 is located, the touch unit C2 can also be detected having a certain signal amount. In this case, the signal amount distribution detected by the touch detection chip 100 is shown in FIG. 4. The distribution which has signal amounts decreasing in the radially outward direction with the amount "339" as a center as shown in FIG. 4 indicates that the signal amount of the touch unit A2 is an effective signal amount, and the signal amount of "104" as shown in FIG. 4 indicates that the signal amount of the touch unit C2 is an ineffective signal amount.

In the above-described case, when a touch operation occurs at the touch unit A2 or the touch unit C2, if the touch detection chip 100 does not process the detected signal amount, it is considered that the touch operation occurs at both the touch unit A2 and the touch unit C2, that is, a "ghost touch" phenomenon occurs, which affects the product yield.

It should be noted that, for the schematic diagrams of signal amount distribution as shown in FIG. 3 and FIG. 4, if the touch operation is not performed at a position corresponding to a touch unit, the signal amount of the touch unit should be zero (0). However, there can be noise in the circuit when the touch panel is working, so the signal amount can fluctuate up and down on the basis of zero (0). For example, there can be a case where the signal amount is negative (for example, −2 as shown in FIG. 3 and FIG. 4).

At least one embodiment of the present disclosure provides a touch detecting method. The touch detecting method including: detecting a signal amount of each of a plurality of touch units; determining candidate touch units according to the signal amount of each of the plurality of touch units; and determining a target touch unit from the candidate touch units according to signal amounts of adjacent touch units of each of the candidate touch units. At least one embodiment of the present disclosure further provides a touch detection chip and a touch panel corresponding to the above-described touch detecting method.

The touch detecting method, the touch detection chip and the touch panel provided in the embodiments of the present disclosure can first determine the candidate touch units by detecting the signal amount of each of the plurality of touch units, and then determine the target touch unit from the candidate touch units, thereby determining the position where a real touch operation occurs, which can effectively prevent the "ghost touch" problem caused by a short circuit and improve the product yield.

The embodiments of the present disclosure will be described in detail below with reference to the accompanying drawings.

Figure 5:
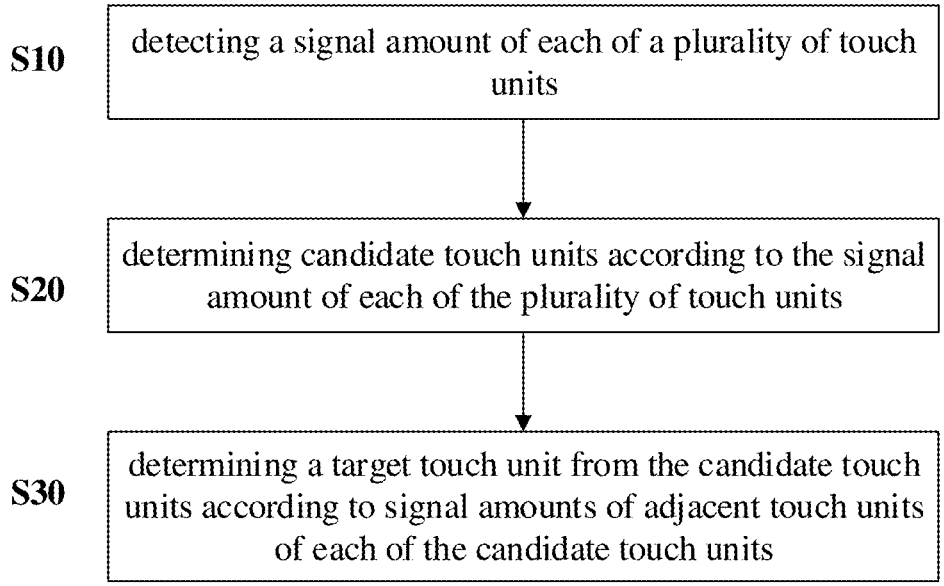
FIG. 5 is a schematic diagram of a touch detecting method according to an example of an embodiment of the present disclosure.

An example of an embodiment of the present disclosure provides a touch detecting method, as shown in FIG. 5, the touch detecting method includes the following operations.

Step S10: detecting a signal amount of each of a plurality of touch units;

Step S20: determining candidate touch units according to the signal amount of each of the plurality of touch units; and Step S30: determining a target touch unit from the candidate touch units according to signal amounts of adjacent touch units of each of the candidate touch units.

When the touch detecting method provided in the present example is performed, the signal amount of each of the plurality of touch units can be detected firstly, and then the candidate touch units are determined according to the signal amount of each of the plurality of touch units. For example, when a finger is used for performing a touch operation, the position of the finger touching a touch panel may cover a plurality of touch units, and the plurality of touch units are determined as the candidate touch units by detecting the corresponding signal amount of each of the plurality of touch units. For example, when a multi-touch operation occurs, the touch units covered by the position of each touch point are determined as candidate touch units by detecting corresponding signal amounts. For another example, if there is a short circuit defect in the touch panel, the touch units in which the short circuit occurs can also be determined as the candidate touch units by detecting corresponding signal amounts.

After the candidate touch units are determined, as described above, if there is a short circuit defect in the touch panel, the candidate touch units may include a "ghost touch" touch unit in which a real touch operation does not occur. Then, the target touch unit can be determined from the candidate touch units according to signal amounts of adjacent touch units of each of the candidate touch units, that is, the target touch unit is such a touch unit at the position where the real touch operation occurs. Therefore, the "ghost touch" problem caused by the short circuit can be effectively prevented, and the product yield can be improved.

For example, in an example of an embodiment of the present disclosure, step S10 includes the following operation.

Step S101: sending a pulse detection signal to each of the plurality of touch units, and detecting a change amount of capacitance value of each of the plurality of touch units.

For example, the signal amount of each of the plurality of touch units comprises the change amount of capacitance value of each of the plurality of touch units caused by the pulse detection signal.

For example, in an example, a touch unit is connected with a touch detection chip through a touch electrode line, and the touch detection chip sends the pulse detection signal to the touch unit through the touch electrode line. For example, the touch detection chip can sequentially send the pulse detection signal to each of the plurality of touch units of the touch panel through a timing control method. For example, the pulse detection signal can adopt a square wave signal, and the square wave signal can charge the capacitor in the touch unit. When a touch operation occurs at the position of a touch unit, the total capacitance Cs of the touch unit satisfies: Cs=Cb+Cf (Cb is the capacitance between the touch unit itself and the ground, and Cf is the increased capacitance due to the touch operation, such as the capacitance between a finger and the ground). In other words, between the time points that are before and after the touch operation occurs respectively, the change amount of the total capacitance Cs of the touch unit is Cf, the touch detection chip can detect the change amount of capacitance value of the touch unit, and the change amount of capacitance value is used as the signal amount of the touch unit.

For example, when the pulse detection signal charges the capacitor in the touch unit, the capacitance value C, the voltage value U, and the charge amount Q satisfy C=Q/U, if the voltage value U does not change, the capacitance value C of the touch unit at the position where the touch operation occurs is increased, and the electric charge amount Q of the touch unit at the position where the touch operation occurs is also increased. For example, the electric charges can be discharged to a capacitor in the touch detection chip through the touch electrode line. At this time, the capacitance value C does not change, the larger the electric charge amount Q, the larger the voltage value U. The touch detection chip can detect a change amount of the voltage value, so as to obtain the change amount of capacitance value of the touch unit at the position where the touch operation is performed between the time points that are before and after the touch operation occurs respectively, and then the change amount of capacitance value is used as the signal amount of the touch unit.

For example, the touch detection chip can obtain a signal amount distribution of all the touch units of the touch panel by detecting the signal amount of each touch unit of the touch panel sequentially, for example, each of FIG. 2, FIG. 3, and FIG. 4 is a schematic diagram of a signal amount distribution.

For example, in an example of an embodiment of the present disclosure, step S20 includes the following operation.

Step S201': judging whether the signal amount of each of the plurality of touch units is greater than a first preset threshold, and determining a touch unit having a signal amount greater than the first preset threshold as the candidate touch unit.

For example, after the step S101, the touch detection chip can obtain the signal amounts of all touch units of the touch panel, and then the touch detection chip can judge whether the signal amount of each touch unit is greater than the first preset threshold sequentially. For example, if the touch units of the touch panel are arranged in an array, the touch detection chip can first judge each touch unit of a row in turn, and then switch to a next row, that is, adopting a row-by-row judgment manner. For another example, the touch detection chip can first judge each touch unit of a column in turn, and then switch to a next column, that is, adopting a column-by-column judgment manner. The embodiments of the present disclosure do not limit the judgement manner.

For example, the first preset threshold can be selected as the amount of 100, for another example, the first preset threshold can be selected as 150, which is not limited by the embodiments of the present disclosure. For example, the selection of the first preset threshold is related to a magnification of an amplifier inside the touch detection chip and the noise that may exist in the circuit, and the first preset threshold can be selected according to actual conditions.

After the touch detection chip judges whether the signal amount of each touch unit is greater than the first preset threshold, the touch detection chip determines a touch unit having a signal amount greater than the first preset threshold as the candidate touch unit.

For another example, in another example of an embodiment of the present disclosure, step S20 includes the following operations.

Step S201: dividing the plurality of touch units into a plurality of touch detection groups;

Step S202: summing signal amounts of touch units in each of the plurality of touch detection groups to obtain a signal amount sum of each of the plurality of touch detection groups;

Step S203: determining a candidate touch detection group from the plurality of touch detection groups, wherein the candidate touch detection group is a touch detection group having a signal amount sum greater than the first preset threshold; and Step S204: judging whether a signal amount of each touch unit in the candidate touch detection group is greater than the first preset threshold, and determining a touch unit having the signal amount greater than the first preset threshold as the candidate touch unit.

In step S201, the plurality of touch units of the touch panel are first divided into a plurality of touch detection groups. For example, in the case where the plurality of touch units are arranged in an array and there are 600×800 (i.e., 600 rows and 800 columns) of touch units in the touch panel, when dividing the touch detection groups, the plurality of touch units can be divided into 600 touch detection groups according to the rows, and the plurality of touch units can also be divided into 800 touch detection groups according to the columns. The embodiments of the present disclosure do not limit the manner in which the touch detection groups are divided. For example, the 600×800 touch units array can be equally divided into multiple arrays, and a size of each array is, for example, 6×8, 12×16, or 24×32 and the like.

After dividing the plurality of touch units into the plurality of touch detection groups in step S201, in step S202, summing signal amounts of touch units in each of the plurality of touch detection groups to obtain a signal amount sum of each of the plurality of touch detection groups. For example, the touch detection chip can sum the signal amounts of touch units in each of the plurality of touch detection groups sequentially to obtain the signal amount sum of each of the plurality of touch detection groups.

In step S203, the candidate touch detection group is determined from the plurality of touch detection groups. For example, the touch detection group having a signal amount sum greater than the first preset threshold is determined as the candidate touch detection group. For the first preset threshold, reference can be made to the corresponding description in step S201', and details are not described here again.

After determining the candidate touch detection group in step S203, in step S204, judging whether the signal amount of each touch unit in the candidate touch detection group is greater than the first preset threshold, and determining a touch unit having the signal amount greater than the first preset threshold as the candidate touch unit. For example, when judging the touch units in the candidate touch detection group, the touch units can be sequentially judged row by row, or can be sequentially judged column by column, or other suitable manners are adopted, which is not limited by the embodiments of the present disclosure.

It should be noted that, for the method described in this example, the embodiments of the present disclosure include, but are not limited to, the example. For example, in step S203, after the candidate touch detection group is determined, each candidate touch detection group can be further divided, each candidate touch detection group is divided into a plurality of sub-touch detection groups, and the dividing method can adopt the same method as that in step S201. Then, each touch unit of each sub-touch detection group is judged to finally determine the candidate touch unit.

To perform the touch detecting method provided in this example, the plurality of touch units are divided into the plurality of touch detection groups, after the candidate touch detection group is determined, and then each touch unit of each candidate touch detection group is judged to determine the candidate touch unit. Compared with the method in the previous example, the method in this example can reduce the calculation amount in processing, thereby reducing the power consumption of the touch detection chip.

For example, in an example of an embodiment of the present disclosure, step S30 includes the following operation.

Step S301: judging whether at least one of the signal amounts of adjacent touch units of one of the candidate touch units is greater than a second preset threshold; and if the at least one of the signal amounts of adjacent touch units of the one of the candidate touch units is greater than the second preset threshold, determining the one of the candidate touch unit is the target touch unit.

In step S301, for example, judging whether one of the signal amounts of adjacent touch units of one of the candidate touch units is greater than a second preset threshold. For example, in the case where the touch units are arranged in an array, for a touch unit not at an edge, the touch unit has eight adjacent touch units, for example, the adjacent touch unit with the largest signal amount in the eight touch units can be selected to judge. If the signal amount of the adjacent touch unit is greater than the second threshold, the candidate touch unit is determined as the target touch unit.

For another example, the signal amount of each of the plurality of touch units adjacent to the candidate touch unit can also be judged, if the signal amount of each of the plurality of touch units adjacent to the candidate touch unit is greater than the second preset threshold, the candidate touch unit is determined as the target touch unit.

For example, the second preset threshold can be selected as the amount of 50, for another example, the second preset threshold can be selected as 100. For a real touch operation, the signal amounts of the touch units near the position where the touch operation occurs decrease in the radially outward direction around the position where the touch operation occurs, so in general, the second preset threshold is smaller than the first preset threshold to achieve an effective judgment. In addition, the selection of the second preset threshold is related to a magnification of an amplifier(s) inside the touch detection chip and the noise that may exist in the circuit, and the second preset threshold can be selected according to actual conditions.

Figure 6:
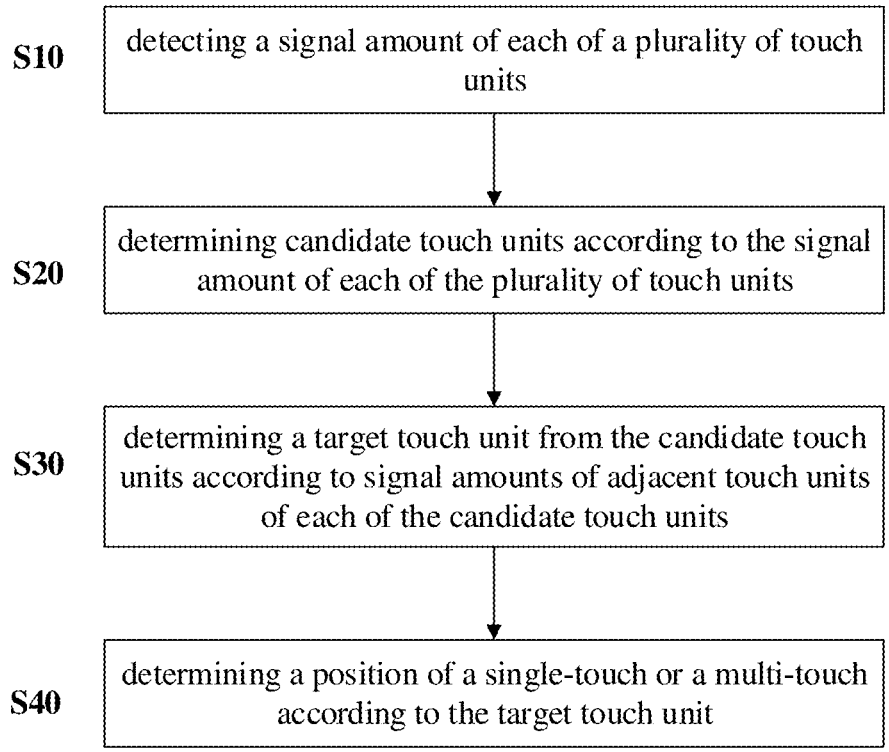
FIG. 6 is a schematic diagram of a touch detecting method according to another example of an embodiment of the present disclosure.

Another example of an embodiment of the present disclosure further provides a touch detecting method, as shown in FIG. 6, the touch detecting method includes the following operation in addition to step S10, step S20, and step S30.

Step S40: determining a position of a single-touch or a multi-touch according to the target touch unit.

After the target touch unit is determined in step S30, for example, in step S40, a position where a real touch occurs can be determined according to the coordinate of the position corresponding to the target touch unit.

For example, when performing a single-touch operation with a stylus, the stylus may cover only one touch unit when it is in contact with the touch panel. After step S10, step S20 and step S30 are performed, the target touch unit can be determined, then step S40 is performed to determine the position at which the stylus performs the single-touch operation according to the coordinate of the position corresponding to the target touch unit.

For example, when performing a single-touch operation with a finger, the finger may cover a plurality of touch units when it is in contact with the touch panel. After step S10, step S20 and step S30 are performed, a plurality of target touch units can be determined, and the target touch units are adjacent to each other. Then step S40 is performed to determine the position at which the finger performs the single-touch operation according to the coordinate of the position corresponding to the plurality of target touch units.

For example, when performing a multi-touch operation with a plurality of fingers, for example, when performing a two-finger zooming or three-finger swiping operation, the plurality of fingers can cover a plurality of touch units when they are in contact with the touch panel. The touch units covered by each of the individual fingers are adjacent to each other, and the touch units covered by different fingers are not adjacent to each other. After step S10, step S20 and step S30 are performed, a plurality of target touch units can be determined, then step S40 is performed to determine the plurality of positions at which the plurality of fingers performs the multi-touch operation according to the coordinates of the plurality of positions corresponding to the plurality of target touch units.

For the "ghost touch" example as shown in FIG. 1 and FIG. 3, the touch detecting method used in the example will be described below with reference to FIG. 5. When a touch operation occurs at the position where the touch unit C2 is located in FIG. 1, due to a short circuit defect, there is a touch abnormality at the touch unit A2 that is short-circuited with the touch unit C2, and the signal amount distribution as shown in FIG. 3 is generated. Assuming that the first preset threshold is 60, it can be determined that the candidate touch units are touch units with signal amounts of 97, 61, 218, 343, 259, 66, 220, 368, 346, 134, 214, 355, 257, 72, 93, and 77 (because the signal amounts of the touch units are greater than the first preset threshold 60), and the touch unit with the signal amount of 77 at the position of the "ghost touch" is also determined as the candidate touch unit. Assuming that the second preset threshold is 50, it can be determined that the target touch units are touch units with signal amounts of 97, 61, 218, 343, 259, 66, 220, 368, 346, 134, 214, 355, 257, 72 and 93 (at least one of the signal amounts of adjacent touch units of one of the candidate touch units is greater than the second preset threshold 50), and the touch unit with the signal amount of 77 at the position of the "ghost touch" has been excluded. Finally, the position where the real touch operation occurs can be determined according to the coordinate of the position corresponding to the target touch unit.

Figure 7:
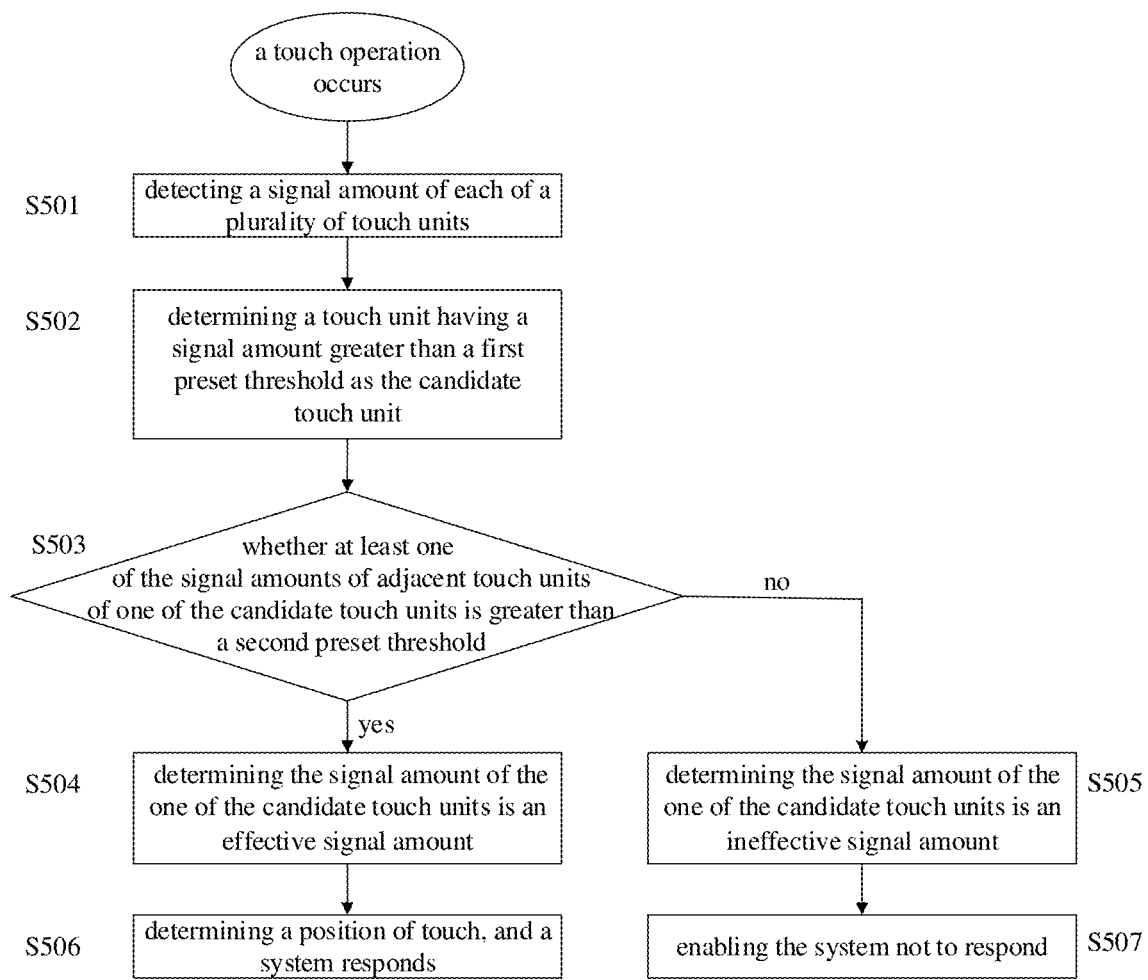
FIG. 7 is a schematic flowchart diagram of a touch detecting method according to an example of an embodiment of the present disclosure.

An embodiment of the present disclosure provides a touch detecting method, and as shown in FIG. 7, the touch detecting method includes the following operations.

Step S501: detecting a signal amount of each of a plurality of touch units;

Step S502: determining a touch unit having a signal amount greater than a first preset threshold as the candidate touch unit;

Step S503: judging whether at least one of the signal amounts of adjacent touch units of one of the candidate touch units is greater than a second preset threshold;

Step S504: if the at least one of the signal amounts of adjacent touch units of the one of the candidate touch units is greater than the second preset threshold, determining the signal amount of the one of the candidate touch units is an effective signal amount;

Step S505: if the at least one of the signal amounts of adjacent touch units of the one of the candidate touch units is not greater than the second preset threshold, determining the signal amount of the one of the candidate touch units is an ineffective signal amount;

Step S506: determining a position of touch, and a system responds according to the position of touch (for example, performing a corresponding touch operation); and Step S507: enabling the system not to respond.

For example, when a touch operation occurs (for example, including a single-touch operation or a multi-touch operation), step S501 is performed firstly, for example, sequentially detecting the signal amounts of all the touch units of the touch panel, and obtaining a signal amount distribution of all the touch units. For the signal amount distribution, step S502 is performed to determine a touch unit having a signal amount greater than the first preset threshold as the candidate touch unit. For the candidate touch unit, step S503 is performed to judge whether at least one of the signal amounts of adjacent touch units of the candidate touch unit is greater than the second preset threshold. If the judging result is yes, step S504 is performed to determine that the signal amount of the candidate touch unit is effective; if the judging result is no, step S505 is performed to determine that the signal amount of the candidate touch unit is ineffective.

After determining the signal amount of the candidate touch unit is effective, that is, the touch operation occurring at the position where the candidate touch unit is located is true and effective, and then step S506 is performed to determine the location where the touch operation occurs. The system can respond further based on the location, such as when an icon of an application is touched by a finger in operation, and accordingly, the system can launch the application. It should be noted that, the system described herein can be an operating system applied to a touch display device, but the embodiments of the present disclosure does not limit this.

After determining the signal amount of the candidate touch unit is ineffective, that is, no real touch operation occurs at the position where the candidate touch unit is located (for example, it may be the "ghost touch" phenomenon caused by a short circuit in the touch panel), then step S507 is performed, and the system is enabled to not respond.

Certainly, in step S502, one or more candidate touch units can be determined, and then operations of steps S503 and S504 (or, steps S503 and S505) are respectively performed for each candidate touch unit until it is determined whether the signal amount of each candidate touch unit is effective. The candidate touch unit having an effective signal amount is a target touch unit. The system determines the touch position according to the position of the target touch unit, and performs touch response. Certainly, if only one candidate touch unit has an effective signal amount, there is only one target touch unit; and if a plurality of candidate touch units have the effective signal amount, there are a plurality of target touch units.

The touch detecting method provided in this embodiment can determine the target touch unit in which the real touch operation occurs according to the signal amounts of the touch unit and the touch unit adjacent thereto, so the position where the real touch occurs can be determined according to the position where the target touch unit is located, and the system can respond accordingly according to the touch position. The touch detecting method can effectively prevent the "ghost touch" problem caused by the short circuit and improve the product yield.

Figure 8:
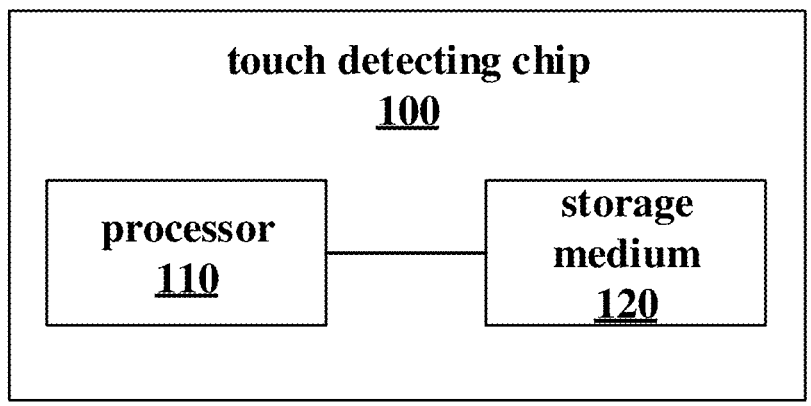
FIG. 8 is a schematic diagram of a touch detection chip according to an embodiment of the present disclosure.

An embodiment of the present disclosure further provides a touch detection chip 100, and as shown in FIG. 8, the touch detection chip 100 includes a processor 110 and a non-volatile storage medium 120. For example, the storage medium 120 is configured to store and has stored computer executable codes executable by the processor 110, and the computer executable codes are capable of being executed by the processor 110 to implement the operations in the touch detecting method provided by the embodiments of the present disclosure, for example, including the operations in step S10, step S101, step S20, step S201', step S201, step S202, step S203, step S204, step S30, step S301 and step S40. For a detailed description of these steps, reference can be made to the corresponding description in the touch detecting method in the embodiment of the present disclosure, and details are not described here again.

For example, the touch detection chip 100 can be implemented as a TDDI (Touch and Display Driver Integration) chip. The TDDI chip can implement the touch detecting methods provided in the embodiments of the present disclosure, and can also implement a display driving, for example, providing a progressive-scan signal to implement a progressive-scan function.

It should be noted that, in the embodiments of the present disclosure, the processor can process data signals and can be implemented in a variety of computational structures, e.g., a complex instruction set computer (CISC) structure, a reduced instruction set computing (RISC) structure or a structure that incorporates a plurality of instruction set combinations. In some embodiments, the processor can also be a microprocessor, e.g., an X86 processor or an ARM processor, and can also be a digital signal processor (DSP), etc. The processor can control other components to execute desired functions. In the embodiments of the present disclosure, the memory can store instructions and/or data executed by the processor. For example, the memory can include one or more computer program products. The computer program products can include various kinds of computer readable storage media, e.g., volatile memory and/or nonvolatile memory. Volatile memory, for example, includes a random access memory (RAM) and/or a cache memory. Nonvolatile memory, for example, includes read-only memory (ROM), hard disk, flash memory, etc. One or more computer program instructions can be stored in the computer readable storage medium. The processor can execute the program instructions to realize the desired functions (implemented by the processor) in the embodiments of the present disclosure.

In addition, the technical effects of the touch detection chip provided in this embodiment, reference can be made to the corresponding parts in the embodiment of the touch detecting method in the present disclosure, and details are not described here again.

Figure 9:
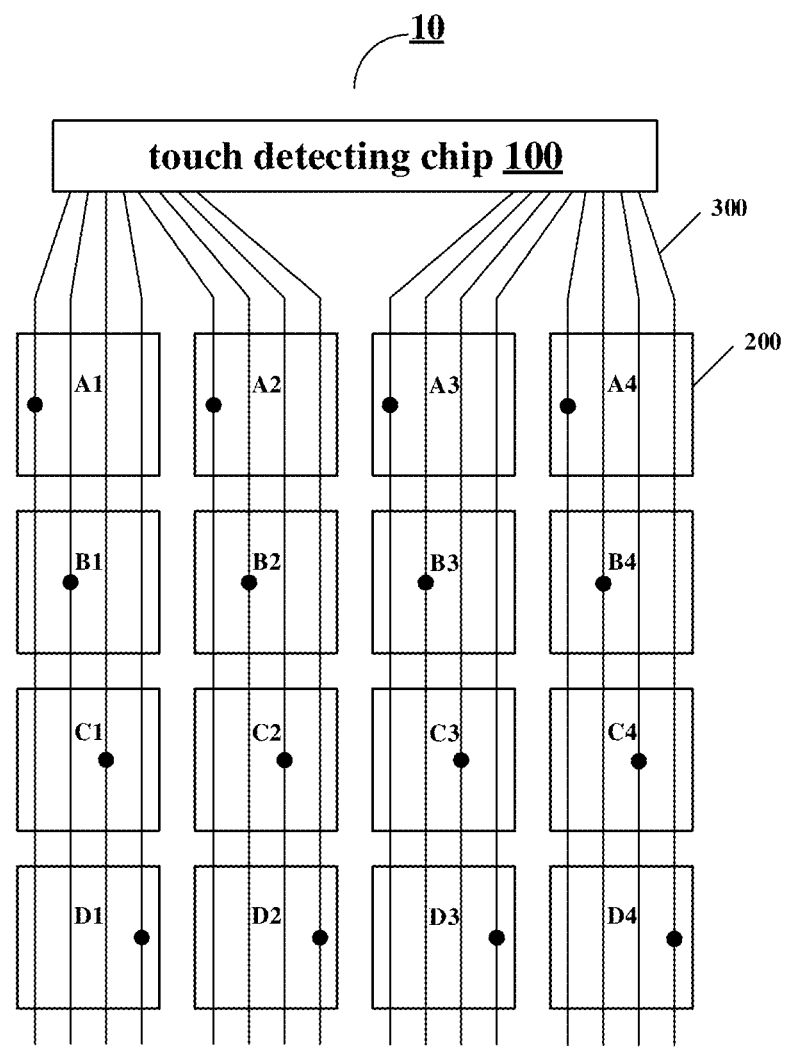
FIG. 9 is a schematic diagram of a touch panel according to an embodiment of the present disclosure.

An embodiment of the present disclosure further provides a touch panel 10, as shown in FIG. 9, the touch panel 10 includes the touch detection chip 100 provided by the embodiment of the present disclosure, a plurality of touch units 200 and a plurality of touch electrode lines 300. The plurality of touch electrode lines 300 are electrically connected with the plurality of touch units 200, respectively.

For example, as shown in FIG. 9, the plurality of touch units 200 are arranged in an array, and each touch unit 200 is connected with the touch detection chip 100 through a single touch electrode line 300. Each of the plurality of touch units 200 and the ground constitutes a self-capacitance. When an object such as a human body or a stylus touches a touch screen, the capacitance of the human body or the stylus is superimposed on the self-capacitance of the touch unit 200, and causing the capacitance value of the unit 200 to be changed. The touch detection chip 100 can detect the change amount of capacitance value of each touch unit 200 through the touch electrode line 300, thereby determining the position coordinate at which the touch occurs.

Because the touch panel 10 includes the touch detection chip 100, the touch detecting methods provided by the embodiments of the present disclosure can be performed during operation, which can effectively prevent the "ghost touch" problem caused by the short circuit in the touch panel and improve the product yield.

It should be noted that, in the drawings of the embodiments of the present disclosure, the sizes of the touch detection chip and the touch unit are only schematic, and do not represent the true size and ratio.

What have been described above are only specific implementations of the present disclosure, the protection scope of the present disclosure is not limited thereto. The protection scope of the present disclosure should be based on the protection scope of the claims.

What is claimed is:
1. A touch detecting method, comprising:
   detecting a signal amount of each of a plurality of touch units;
   determining candidate touch units according to the signal amount of each of the plurality of touch units; and
   determining a target touch unit from the candidate touch units according to signal amounts of adjacent touch units of each of the candidate touch units,
   wherein determining the candidate touch units according to the signal amounts of each of the plurality of touch units comprises:
      dividing the plurality of touch units into a plurality of touch detection groups;
      summing signal amounts of touch units in each of the plurality of touch detection groups to obtain a signal amount sum of each of the plurality of touch detection groups;
      determining a candidate touch detection group from the plurality of touch detection groups, wherein the candidate touch detection group is a touch detection group having a signal amount sum greater than a first preset threshold; and
      judging whether a signal amount of each touch unit in the candidate touch detection group is greater than the first preset threshold, and determining a touch unit having the signal amount greater than the first preset threshold as the candidate touch unit.

2. The touch detecting method according to claim 1, wherein detecting a signal amount of each of the plurality of touch units comprises:
   sending a pulse detection signal to each of the plurality of touch units, and detecting a change amount of capacitance value of each of the plurality of touch units, wherein the signal amount of each of the plurality of touch units comprises the change amount of capacitance value of each of the plurality of touch units.

3. The touch detecting method according to claim 1, wherein determining the candidate touch units according to the signal amount of each of the plurality of touch units comprises:
   judging whether the signal amount of each of the plurality of touch units is greater than a first preset threshold, and determining a touch unit having a signal amount greater than the first preset threshold as the candidate touch unit.

4. The touch detecting method according to claim 1, wherein dividing the plurality of touch units into the plurality of touch detection groups comprises:
   dividing the plurality of touch units into the plurality of touch detection groups according to rows or columns.

5. The touch detecting method according to claim 1, wherein determining the target touch unit from the candidate touch units according to signal amounts of adjacent touch units of each of the candidate touch units comprises:
   judging whether at least one of the signal amounts of adjacent touch units of one of the candidate touch units is greater than a second preset threshold; and
   if the at least one of the signal amounts of adjacent touch units of the one of the candidate touch units is greater than the second preset threshold, determining the one of the candidate touch unit is the target touch unit.

6. The touch detecting method according to claim 1, further comprising:
   determining a position of a single-touch or a multi-touch according to the target touch unit.

7. The touch detecting method according to claim 3, wherein determining the target touch unit from the candidate touch units according to signal amounts of adjacent touch units of each of the candidate touch units comprises:

judging whether at least one of the signal amounts of adjacent touch units of one of the candidate touch units is greater than a second preset threshold; and if the at least one of the signal amounts of adjacent touch units of the one of the candidate touch units is greater than the second preset threshold, determining the one of the candidate touch unit is the target touch unit.

8. The touch detecting method according to claim 7, further comprising:

determining a position of a single-touch or a multi-touch according to the target touch unit.

9. A touch detection chip, comprising a processor and a non-volatile storage medium, wherein the storage medium stores computer executable codes, and the computer executable codes are capable of being executed by the processor to implement following operations:

detecting a signal amount of each of a plurality of touch units;

determining candidate touch units according to the signal amount of each of the plurality of touch units; and determining a target touch unit from the candidate touch units according to signal amounts of adjacent touch units of each of the candidate touch units, wherein determining the candidate touch units according to the signal amounts of each of the plurality of touch units comprises:

dividing the plurality of touch units into a plurality of touch detection groups;

summing signal amounts of touch units in each of the plurality of touch detection groups to obtain a signal amount sum of each of the plurality of touch detection groups;

determining a candidate touch detection group from the plurality of touch detection groups, wherein the candidate touch detection group is a touch detection group having a signal amount sum greater than a first preset threshold; and judging whether a signal amount of each touch unit in the candidate touch detection group is greater than the first preset threshold, and determining a touch unit having the signal amount greater than the first preset threshold as the candidate touch unit.

10. The touch detection chip according to claim 9, wherein detecting a signal amount of each of the plurality of touch units comprises:

sending a pulse detection signal to each of the plurality of touch units, and detecting a change amount of capacitance value of each of the plurality of touch units, wherein the signal amount of each of the plurality of touch units comprises the change amount of capacitance value of each of the plurality of touch units.

11. The touch detection chip according to claim 9, wherein determining the candidate touch units according to the signal amount of each of the plurality of touch units comprises:

judging whether the signal amount of each of the plurality of touch units is greater than a first preset threshold, and determining a touch unit having a signal amount greater than the first preset threshold as the candidate touch unit.

12. The touch detection chip according to claim 9, wherein dividing the plurality of touch units into the plurality of touch detection groups comprises:

dividing the plurality of touch units into the plurality of touch detection groups according to rows or columns.

13. The touch detection chip according to claim 9, wherein determining the target touch unit from the candidate touch units according to signal amounts of adjacent touch units of each of the candidate touch units comprises:

judging whether at least one of the signal amounts of adjacent touch units of one of the candidate touch units is greater than a second preset threshold; and if the at least one of the signal amounts of adjacent touch units of the one of the candidate touch units is greater than the second preset threshold, determining the one of the candidate touch unit is the target touch unit.

14. The touch detection chip according to claim 9, wherein the computer executable codes are capable of being executed by the processor to further implement following operation:

determining a position of a single-touch or a multi-touch according to the target touch unit.

15. The touch detection chip according to claim 11, wherein the determining the target touch unit from the candidate touch units according to signal amounts of adjacent touch units of each of the candidate touch units comprises:

judging whether at least one of the signal amounts of adjacent touch units of one of the candidate touch units is greater than a second preset threshold; and if the at least one of the signal amounts of adjacent touch units of the one of the candidate touch units is greater than the second preset threshold, determining the one of the candidate touch unit is the target touch unit.

16. The touch detection chip according to claim 15, wherein the computer executable codes are capable of being executed by the processor to further implement following operation:

determining a position of a single-touch or a multi-touch according to the target touch unit.

17. The touch detection chip according to claim 9, wherein the touch detection chip comprises a touch-and-display driver integration chip.

18. A touch panel, comprising: the touch detection chip according to claim 9, a plurality of touch units and a plurality of touch electrode lines, wherein the plurality of touch electrode lines are electrically connected with the plurality of touch units, respectively.

* * * * *